United States Patent
Da Palma et al.

(10) Patent No.: US 7,818,432 B2
(45) Date of Patent: Oct. 19, 2010

(54) SEAMLESS REFLECTION OF MODEL UPDATES IN A VISUAL PAGE FOR A VISUAL CHANNEL IN A COMPOSITE SERVICES DELIVERY SYSTEM

(75) Inventors: William V. Da Palma, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 11/297,497

(22) Filed: Dec. 8, 2005

(65) Prior Publication Data

US 2007/0136442 A1   Jun. 14, 2007

(51) Int. Cl.
 *G06F 15/16* (2006.01)
(52) U.S. Cl. .................. 709/227; 709/200; 709/219; 709/228; 715/200; 715/226
(58) Field of Classification Search ................ 709/223, 709/224, 227, 200, 219, 228; 715/200, 226
See application file for complete search history.

(56) References Cited

U.S. PATENT DOCUMENTS

| | | | |
|---|---|---|---|
| 5,278,943 A | 1/1994 | Gasper et al. | |
| 5,774,551 A | 6/1998 | Wu et al. | |
| 5,781,720 A * | 7/1998 | Parker et al. | 714/38 |
| 5,873,094 A | 2/1999 | Talatik | |
| 6,195,697 B1 | 2/2001 | Bowman-Amuah | |
| 6,269,336 B1 | 7/2001 | Ladd et al. | |
| 6,272,625 B1 | 8/2001 | DeCarmo | |
| 6,298,370 B1 | 10/2001 | Tang et al. | |
| 6,301,609 B1 | 10/2001 | Aravamudan et al. | |
| 6,317,794 B1 | 11/2001 | Papierniak et al. | |
| 6,351,271 B1 | 2/2002 | Mainwaring et al. | |
| 6,366,771 B1 | 4/2002 | Angle et al. | |
| 6,370,508 B2 | 4/2002 | Beck et al. | |
| 6,442,547 B1 | 8/2002 | Bowman-Amuah | |
| 6,523,035 B1 | 2/2003 | Fleming et al. | |
| 6,606,744 B1 | 8/2003 | Mikurak | |

(Continued)

FOREIGN PATENT DOCUMENTS

CN        1697419 A      11/2005

(Continued)

OTHER PUBLICATIONS

Licciardi et al. Technologies and Guidelines for service creation in NGN, 8th ITU International Conference on Itelligence in Networks 2003.*

(Continued)

*Primary Examiner*—John Follansbee
*Assistant Examiner*—Anthony Mejia
(74) *Attorney, Agent, or Firm*—Jeanine S. Ray-Yarletts, Esq.; Steven M. Greenberg, Esq.; Carey, Rodriguez, Greenberg & Paul, LLP

(57) ABSTRACT

Embodiments of the present invention provide a method, system and computer program product for seamlessly updating a user interface element in a visible page for a visible channel of access to a common session in a composite services enablement environment can be provided. The method can include establishing a visible channel of access to a shared session shared commonly with other channels of access in the composite services enablement environment, rendering a visible page for the visible channel of access and a hidden page for the visible channel of access, reloading the hidden page at a determined interval to capture updates to a model for the shared session applied over the other channels of access, receiving in the hidden page a change in value for a user interface element reflecting an update for the model for the shared session, and causing the visible page to reflect the change in value for a corresponding user interface element in the visible page.

13 Claims, 4 Drawing Sheets

U.S. PATENT DOCUMENTS

| | | |
|---|---|---|
| 6,611,867 B1 | 8/2003 | Bowman-Amuah |
| 6,618,490 B1 | 9/2003 | Cham et al. |
| 6,662,340 B2 | 12/2003 | Rawat et al. |
| 6,724,403 B1 | 4/2004 | Santoro et al. |
| 6,735,566 B1 | 5/2004 | Brand |
| 6,738,804 B1 * | 5/2004 | Lo .................. 709/219 |
| 6,757,362 B1 | 6/2004 | Cooper et al. |
| 6,810,429 B1 | 10/2004 | Walsh et al. |
| 6,910,074 B1 | 6/2005 | Amin et al. |
| 7,023,840 B2 | 4/2006 | Golla et al. |
| 7,177,881 B2 | 2/2007 | Schwesig et al. |
| 7,203,907 B2 * | 4/2007 | Weng et al. ............ 715/748 |
| 7,210,098 B2 * | 4/2007 | Sibal et al. ............ 715/205 |
| 7,233,933 B2 | 6/2007 | Horvitz et al. |
| 7,330,487 B2 | 2/2008 | Chang et al. |
| 7,334,018 B2 | 2/2008 | Elms |
| 7,336,628 B2 | 2/2008 | Chang et al. |
| 7,337,405 B2 | 2/2008 | Weng et al. |
| 7,356,567 B2 | 4/2008 | Odell et al. |
| 7,480,698 B2 * | 1/2009 | Potter ................... 709/217 |
| 7,525,937 B2 | 4/2009 | O'Neill |
| 7,640,512 B1 * | 12/2009 | Appling .............. 715/771 |
| 2001/0027474 A1 | 10/2001 | Nachman et al. |
| 2001/0034738 A1 | 10/2001 | Cantwell et al. |
| 2001/0052023 A1 | 12/2001 | Lin et al. |
| 2002/0016736 A1 | 2/2002 | Cannon et al. |
| 2002/0052032 A1 | 5/2002 | Curtis et al. |
| 2002/0055350 A1 | 5/2002 | Gupte et al. |
| 2002/0089539 A1 * | 7/2002 | Lindhorst et al. ......... 345/764 |
| 2002/0099602 A1 | 7/2002 | Moskowitz et al. |
| 2002/0105909 A1 | 8/2002 | Flanagan et al. |
| 2002/0140731 A1 | 10/2002 | Subramaniam et al. |
| 2002/0154162 A1 | 10/2002 | Bhatia et al. |
| 2002/0169613 A1 | 11/2002 | Damiba |
| 2002/0184346 A1 | 12/2002 | Mani |
| 2002/0184373 A1 | 12/2002 | Maes |
| 2002/0184610 A1 | 12/2002 | Chong et al. |
| 2002/0187750 A1 | 12/2002 | Majumdar |
| 2002/0194388 A1 | 12/2002 | Boloker et al. |
| 2003/0023953 A1 | 1/2003 | Lucassen et al. |
| 2003/0026269 A1 | 2/2003 | Paryani |
| 2003/0040995 A1 | 2/2003 | Daddario et al. |
| 2003/0046088 A1 | 3/2003 | Yuschik |
| 2003/0055884 A1 | 3/2003 | Yuen et al. |
| 2003/0088421 A1 | 5/2003 | Maes et al. |
| 2003/0095540 A1 | 5/2003 | Mulligan et al. |
| 2003/0108063 A1 | 6/2003 | Joseph et al. |
| 2003/0110297 A1 | 6/2003 | Tabatabai et al. |
| 2003/0120813 A1 | 6/2003 | Majumdar et al. |
| 2003/0149749 A1 * | 8/2003 | Carlucci et al. ........... 709/219 |
| 2003/0182622 A1 | 9/2003 | Sibal et al. |
| 2003/0204561 A1 | 10/2003 | Briscoe et al. |
| 2003/0212762 A1 | 11/2003 | Barnes et al. |
| 2003/0223381 A1 | 12/2003 | Schroderus |
| 2004/0039795 A1 * | 2/2004 | Percival .................. 709/218 |
| 2004/0078787 A1 | 4/2004 | Borek et al. |
| 2004/0104938 A1 * | 6/2004 | Saraswat et al. ........... 345/764 |
| 2004/0111394 A1 * | 6/2004 | Fish et al. .............. 707/3 |
| 2004/0128342 A1 | 7/2004 | Maes et al. |
| 2004/0133888 A1 | 7/2004 | Ard et al. |
| 2004/0172254 A1 | 9/2004 | Sharma et al. |
| 2004/0172258 A1 | 9/2004 | Dominach et al. |
| 2004/0181461 A1 | 9/2004 | Raiyani et al. |
| 2004/0199529 A1 | 10/2004 | Clark et al. |
| 2004/0199574 A1 | 10/2004 | Franco et al. |
| 2004/0205614 A1 | 10/2004 | Keswa |
| 2004/0215824 A1 | 10/2004 | Payrits |
| 2004/0230466 A1 | 11/2004 | Davis et al. |
| 2004/0250201 A1 | 12/2004 | Caspi |
| 2004/0254957 A1 | 12/2004 | Hyotyniemi et al. |
| 2004/0255030 A1 | 12/2004 | Sillanpaa |
| 2005/0021826 A1 | 1/2005 | Kumar |
| 2005/0027495 A1 | 2/2005 | Matichuk |
| 2005/0060138 A1 | 3/2005 | Wang et al. |
| 2005/0069225 A1 | 3/2005 | Schneider et al. |
| 2005/0125541 A1 | 6/2005 | Frank et al. |
| 2005/0129198 A1 | 6/2005 | Sudhir et al. |
| 2005/0132023 A1 | 6/2005 | Cazzolla et al. |
| 2005/0136897 A1 | 6/2005 | Praveenkumar et al. |
| 2005/0147216 A1 | 7/2005 | Janakiraman et al. |
| 2005/0152522 A1 | 7/2005 | Kumhyr |
| 2005/0172331 A1 * | 8/2005 | Blackketter et al. ......... 725/135 |
| 2005/0198099 A1 | 9/2005 | Motsinger et al. |
| 2005/0203944 A1 | 9/2005 | Dinh et al. |
| 2005/0251393 A1 | 11/2005 | Georgescu |
| 2005/0278444 A1 * | 12/2005 | Sims et al. .............. 709/224 |
| 2005/0283364 A1 | 12/2005 | Longe et al. |
| 2006/0015600 A1 | 1/2006 | Piper |
| 2006/0036770 A1 | 2/2006 | Hosn et al. |
| 2006/0069563 A1 | 3/2006 | Ju et al. |
| 2006/0074980 A1 | 4/2006 | Sarkar |
| 2006/0168002 A1 | 7/2006 | Chesley |
| 2006/0195584 A1 | 8/2006 | Baumann |
| 2006/0200569 A1 | 9/2006 | Koch et al. |
| 2006/0212511 A1 | 9/2006 | Garcia-Martin |
| 2006/0282856 A1 | 12/2006 | Errico et al. |
| 2006/0287866 A1 * | 12/2006 | Cross et al. .............. 704/275 |
| 2007/0005990 A1 | 1/2007 | Sathish |
| 2007/0006075 A1 * | 1/2007 | Lection et al. ............. 715/530 |
| 2007/0049281 A1 | 3/2007 | Chen et al. |
| 2007/0081557 A1 | 4/2007 | Binetti et al. |
| 2007/0100981 A1 | 5/2007 | Adamczyk et al. |
| 2007/0124507 A1 | 5/2007 | Gurram et al. |
| 2007/0180075 A1 | 8/2007 | Chasman et al. |

FOREIGN PATENT DOCUMENTS

| | | |
|---|---|---|
| EP | 1199872 A2 | 4/2002 |
| EP | 1411704 A2 | 4/2004 |
| GB | 2389479 | 10/2003 |
| WO | 0005903 A2 | 2/2000 |
| WO | 0131472 | 5/2001 |
| WO | 0221300 A1 | 3/2002 |
| WO | 03056769 A1 | 7/2003 |
| WO | 03079144 A2 | 9/2003 |
| WO | 2004064321 A1 | 7/2004 |

OTHER PUBLICATIONS

Georgescu, S., et al; Multimodal IMS Services: The Adaptive Keyword Spotting Interaction Paradigm; Autonomic & Autonomous Systems & Int'l Conference on Networking & Services; 2005; ICAS-ICNS 2005. Joint Int'l Conference on Papette, Tahiti, Oct. 23-28, 2005, Piscataway, NJ; IEEE, Oct. 23, 2005, pp. 1-6; XP010864688; ISSN: 0-7695-2450-8, p. 1-5.

Engelsma, J., et al; Distributed Multimodal Synchronization Protocol; IETF Standard-Working Draft, Internet Engineering Task Force, IETF, CH, Jul. 8, 2005, pp. 1-71, XP0105041593; ISSN; 0000-0004; pp. 3-8.

Bodell, M., et al; W3C Multimodal Interaction Citation, [Online] May 6, 2003, pp. 1-19, XP002305381; retrieved from the Internet: URL: www.w3.org/TR/mmi-framework/ [retrieved on Nov. 12, 2004] p. 2-18.

* cited by examiner

SEAMLESS REFLECTION OF MODEL UPDATES IN A VISUAL PAGE FOR A VISUAL CHANNEL IN A COMPOSITE SERVICES DELIVERY SYSTEM

BACKGROUND OF THE INVENTION

1. Field of the Invention

The present invention relates to the field of next generation networking (NGN) and more particularly to the deployment and delivery of composite services over an NGN network.

2. Description of the Related Art

Next generation networking (NGN) refers to emerging computing networking technologies that natively support data, video and voice transmissions. In contrast to the circuit switched telephone networks of days gone by, NGN networks are packet switched and combine voice and data in a single network. Generally, NGN networks are categorized by a split between call control and transport. Also, in NGN networks, all information is transmitted via packets which can be labeled according to their respective type. Accordingly, individual packets are handled differently depending upon the type indicated by a corresponding label.

The IP Multimedia Subsystem (IMS) is an open, standardized, operator friendly, NGN multimedia architecture for mobile and fixed services. IMS is a Voice over Internet Protocol (VoIP) implementation based upon a variant of the session initiation protocol (SIP), and runs over the standard Internet protocol (IP). Telecom operators in NGN networks offer network controlled multimedia services through the utilization of IMS. The aim of IMS is to provide new services to users of an NGN network in addition to currently available services. This broad aim of IMS is supported through the extensive use of underlying IP compatible protocols and corresponding IP compatible interfaces. In this way, IMS can merge the Internet with the wireless, cellular space so as to provide to cellular technologies ubiquitous access useful services deployed on the Internet.

Multimedia services can be distributed both within NGN networks and non-NGN networks, alike, through the use of markup specified documents. In the case of a service having a visual interface, visually oriented markup such as the extensible hypertext markup language (XHTML) and its many co-species can specify the visual interface for a service when rendered in a visual content browser through a visual content channel, for instance a channel governed by the hypertext transfer protocol (HTTP). By comparison, an audio interface can be specified for a service by voice oriented markup such as the voice extensible markup language (VoiceXML). In the case of an audio interface, a separate voice channel, for instance a channel governed according to SIP.

In many circumstances, it is preferred to configure services to be delivered across multiple, different channels of differing modalities, including the voice mode and the visual mode. In this regard, a service provider not always can predict the interactive modality through which a service is to be accessed by a given end user. To accommodate this uncertainty, a service can be prepared for delivery through each anticipated modality, for instance by way of voice markup and visual markup. Generating multiple different markup documents to satisfy the different modalities of access, however, can be tedious. In consequence, merging technologies such as the XHTML+VoiceXML (X+V) have been utilized to simplify the development process.

Specifically, X+V represents one technical effort to produce a multimodal application development environment. In X+V, XHTML and VoiceXML can be mixed in a single document. The XHTML portion of the document can manage visual interactions with an end user, while the VoiceXML portion of the document can manage voice interactions with the end user. In X+V, command, control and content navigation can be enabled while simultaneously rendering multimodal content. In this regard, the X+V profile specifies how to compute grammars based upon the visual hyperlinks present in a page.

Processing X+V documents, however, requires the use of a proprietary browser in the client devices utilized by end users when accessing the content. Distributing multimedia services to a wide array of end user devices, including pervasive devices across NGN networks, can be difficult if one is to assume that all end user devices are proprietarily configured to handle X+V and other unifying technologies. Rather, at best, it can only be presumed that devices within an NGN network are equipped to process visual interactions within one, standard channel of communication, and voice interactions within a second, standard channel of communication.

Thus, despite the promise of X+V, to truly support multiple modalities of interaction with services distributed about an NGN or, even a non-NGN network, different channels of communications must be established for each different modality of access. Moreover, each service must be separately specified for each different modality. Finally, once a session has been established across one modality of access to a service, one is not able to change mid-session to a different modality of access to the same service within the same session. As a result, the interactions across different channels accommodating different modalities of interaction remain unsynchronized and separate. Consequently, end users cannot freely switch between modalities of access for services in an NGN network.

BRIEF SUMMARY OF THE INVENTION

Embodiments of the present invention address deficiencies of the art in respect to deploying and delivering a service to be accessed through different channels of access in an NGN network, and provide a novel and non-obvious method, system and apparatus for deploying and delivering composite services in an NGN network. As used herein, a composite service is a service deployed across an NGN network that has been enabled to be accessed through multiple, different modalities of access in correspondingly different channels while maintaining the synchronization of the state of the service between the different channels of access.

In a first embodiment of the invention, a composite service enabling data processing system can include multiple channel servlets enabled to establish for a common session, multiple different channels of access to the composite service. The system also can include a location registry including a table of entries associating the different channels of access with the common session. The system yet further can include a model servlet configured for coupling to a model for the common session and for modifying state data in the model for the common session. Finally, the model servlet can be enabled to synchronize views for each of the different channels of access to the composite service responsive to changes detected in the model.

At least one of the views can include a visible page coupled to a hidden page The hidden page can include both a refresh attribute specifying a refresh interval for the hidden page, and also a configuration to cause the visible page to update a user interface element in the visible page with a value provided by the hidden page responsive to the hidden page detecting a value change in the model for a user interface element in the hidden page corresponding to the user interface element in the visible page. The hidden page further can include an additional configuration to apply an update to the model responsive to receiving a request to update the model from the visible page. Alternatively, the system can include an additional hidden page including a configuration to apply an update to the model responsive to receiving a request to update the model from the visible page.

The visible page can include a refresh script exposed to the hidden page and enabled to apply a value provided by the hidden page to a specified user interface element in the visible page. As such, the configuration of the hidden page can include a complimentary update script exposed to the visible page and enabled to invoke the refresh script in the visible page responsive to detecting a value change in the model for a user interface element in the hidden page corresponding to the user interface element in the visible page. Alternatively, the additional configuration of the hidden page can include a complimentary update script exposed to the visible page enabled to apply an update to the model responsive to receiving a request to update the model from the visible page. Finally, the visible page can include an update script enabled to call the complimentary update script in the hidden page responsive to receiving a request to update the model from within the visible page.

In another embodiment of the invention, a method for seamlessly updating a user interface element in a visible page for a visible channel of access to a common session in a composite services enablement environment can be provided. The method can include establishing a visible channel of access to a shared session shared commonly with other channels of access in the composite services enablement environment, rendering a visible page for the visible channel of access and a hidden page for the visible channel of access, reloading the hidden page at a determined interval to capture updates to a model for the shared session applied over the other channels of access, receiving in the hidden page a change in value for a user interface element reflecting an update for the model for the shared session, and causing the visible page to reflect the change in value for a corresponding user interface element in the visible page.

For example, rendering a visible page for the visible channel of access and a hidden page for the visible channel of access can include rendering a form with fields in the visible page, configuring the visible page with a refresh script enabled to apply a value change to a selected one of the fields, configuring the hidden page to refresh at a specified interval, and further configuring the hidden page with a complimentary refresh script enabled to call the refresh script in the visible page to apply a value change to the selected one of the fields corresponding to a field in the hidden page. Also, the method can include receiving in the visible page a request to update the model for the shared session, and causing the hidden page to update the model for the shared session.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for delivering composite services in an NGN network. In accordance with an embodiment of the present invention, different channels of access to a service can be established for accessing a service through corresponding different modalities of access including voice and visual modes. Specifically, interactions with a service within a session can be provided across selected ones of the different channels, each channel corresponding to a different modality of access to the service. In the case of a voice modality and a visual modality, a separate markup document can be utilized in each selected channel according to the particular modality for that channel.

Importantly, each channel utilized for accessing a service within a session can be associated with each other channel accessing the service within the same session. In consequence, the state of the service—stored within a model in a model-view-controller architecture—can be maintained irrespective of the channel used to change the state of the service. Moreover, the representation of the service can be synchronized in each view for the selected ones of the different channels. As such, an end user can interact with the service in a single session across different channels of access using different modalities of access without requiring burdensome, proprietary logic deployed within a client computing device.

Ordinarily, to reflect changes in an underlying model in a view for a visual channel of access to the model, the view must be refreshed periodically. Refreshing a view periodically where the view is defined by markup rendered in a content browser can be intrusive as the content browser repeatedly reloads the markup. In consequence, in the present invention, frequent reloading of the view can be avoided through the use of a hidden page child to the visible page of the view. The hidden page can be communicatively coupled to the model in the composite services enabler and can frequently and periodically refresh without impacting the display of the visible page. Whenever an update to a field in the hidden page is detected, the updated value can be applied to a corresponding field in the visible page without requiring a reloading of the visible page.

Figure 1:
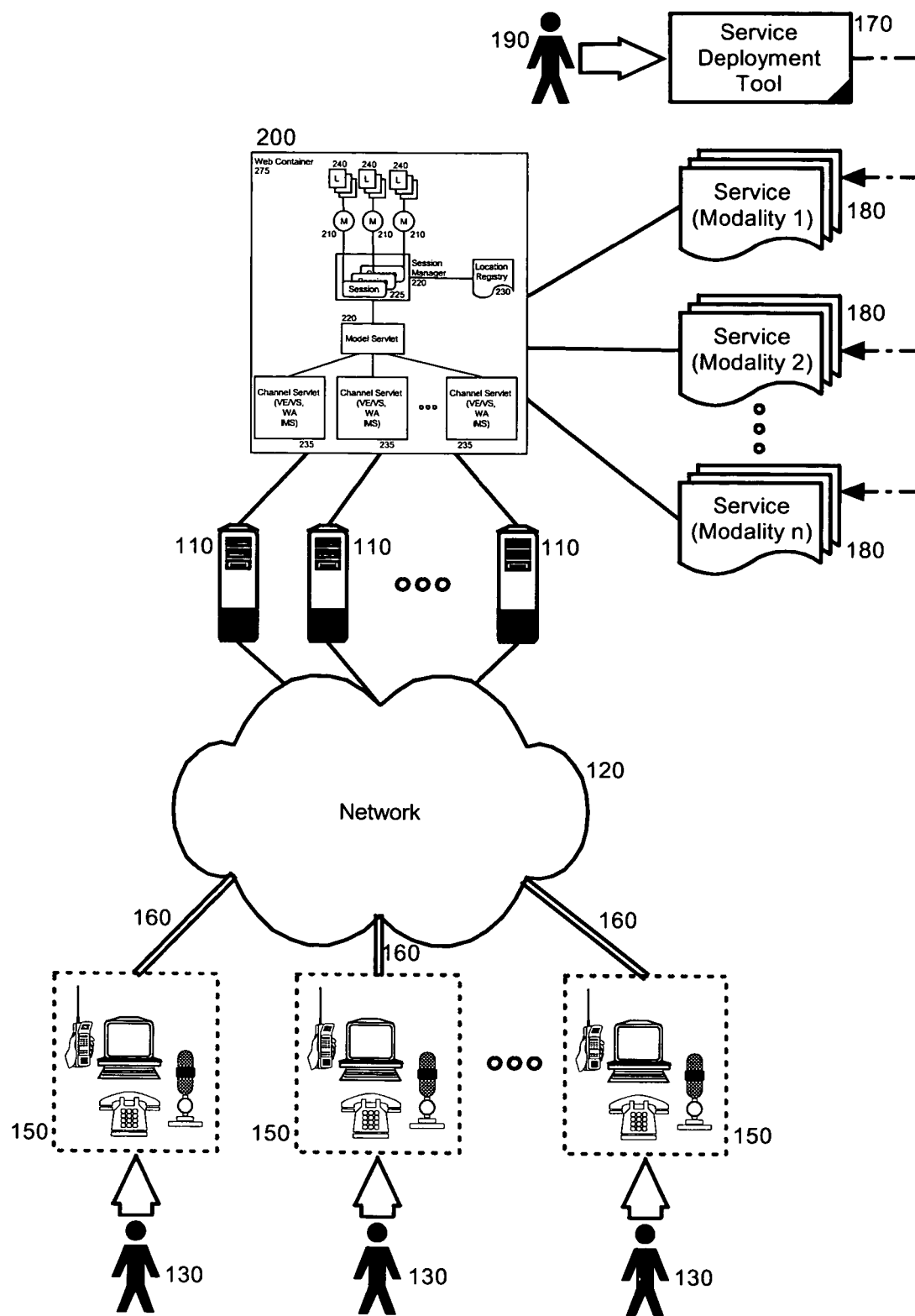
FIG. 1 is a pictorial illustration of an IMS configured for use with a data processing system arranged to deploy and deliver composite services in an NGN network.

Advantageously, the system of the present invention can be embodied within an IMS in a NGN network. In illustration, FIG. 1 is a pictorial illustration of an IMS configured for use with a data processing system enabled to establish a voice channel of access to a session for a composite service from a visual channel of access to the session in an NGN network. As shown in FIG. 1, a composite service enablement data processing system 200 can be arranged to deploy and deliver a composite multimedia service 180 in an NGN network 120. As used herein, a "composite multimedia service" can be a service configured to be accessed through multiple different views of different modalities across correspondingly different channels of communications.

More specifically, the composite multimedia service 180 can be accessed through several different modalities, including a visual mode, an instant messaging mode and a voice mode. Each modality of access can be produced by a developer 190 through the use of a service deployment tool 170. The service deployment tool 170 can be configured to produce the different modalities of access for the composite multimedia service 180, including visual markup to provide visual access to the composite multimedia service 180, and voice markup to provide audible access to the composite multimedia service 180.

One or more gateway server platforms 110 can be coupled to the composite service enablement data processing system 200. Each of gateway server platforms 110 can facilitate the establishment of a communication channel for accessing the composite multimedia service 180 according to a particular modality of access. For example, the gateway server platforms 110 can include a content server such as a Web server enabled to serve visual markup for accessing the composite multimedia service 180 over the NGN network 120 through a visual mode. Likewise, the gateway server platforms 110 can include a voice server enabled to provide audible access to the composite multimedia service 180 over the NGN network 120 through an audible mode.

End users 130 can access the composite multimedia service 180 utilizing any one of a selection of client access devices 150. Application logic within each of the client access devices 150 can provide an interface for a specific modality of access. Examples include a content browser within a personal computing device, an audible user interface within a pervasive device, a telephonic user interface within a telephone handset, and the like. Importantly, each of the provided modalities of access can utilize a separate one of multiple channels 160 established with a corresponding gateway server platform 110 over the network 120 for the same session with the composite multimedia service 180. In this regard, a session with the composite multimedia service 180 can subsist across the multiple channels 160 to provide different modalities of access to the composite multimedia service 180 for one of the end users 130.

Figure 2:
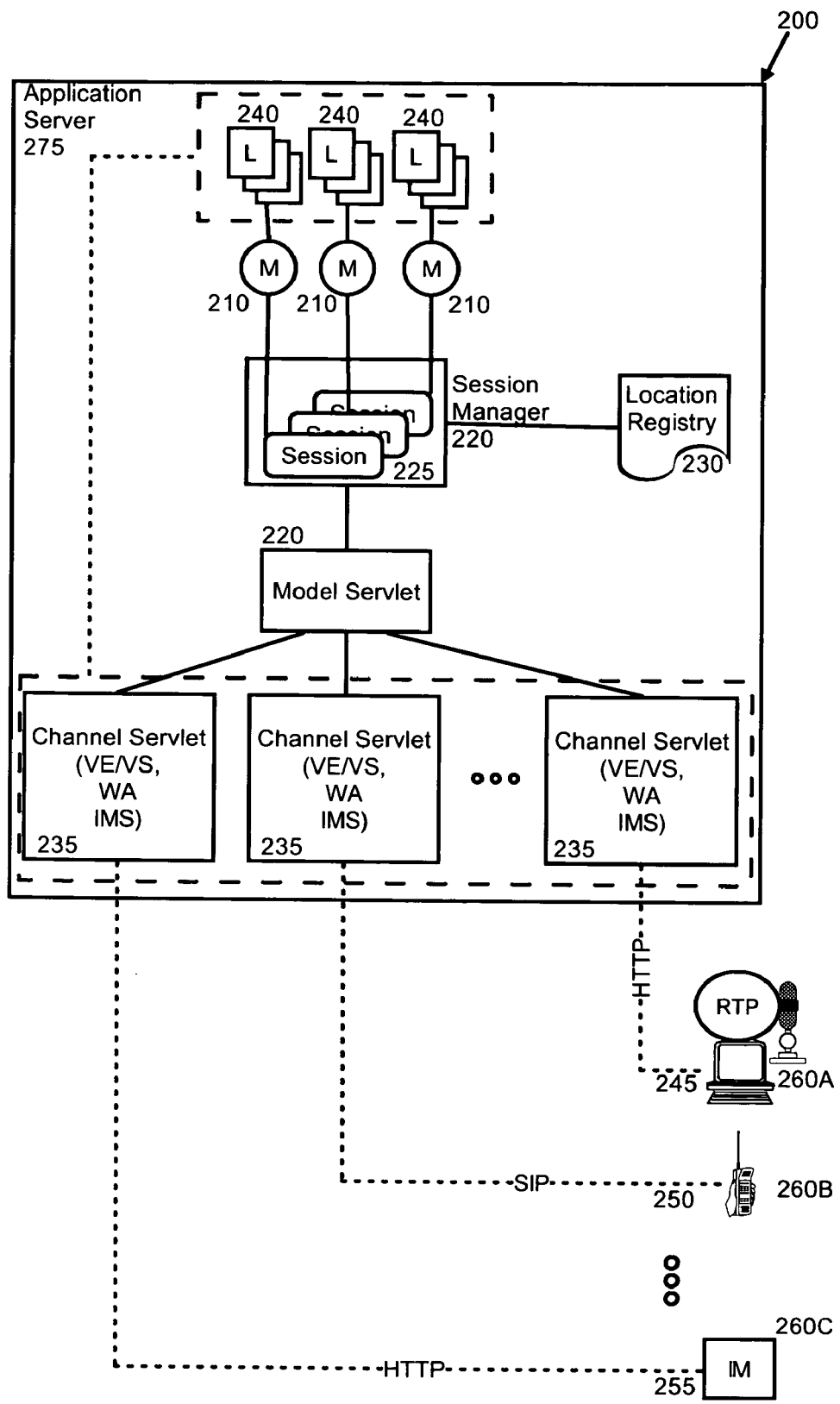
FIG. 2 is a schematic illustration of a data processing system arranged to deploy and deliver composite services in an NGN network; and, FIG. 3 is a flow chart illustrating a process for delivering composite services in an NGN network.

In more particular illustration, FIG. 2 is a schematic illustration of the composite service enablement data processing system 200 of FIG. 1. The composite service enablement data processing system 200 can operate in an application server 275 and can include multiple channel servlets 235 configured to process communicative interactions with corresponding sessions 225 for a composite multimedia service over different channels of access 245, 250, 255 for different endpoint types 260A, 260B, 260C in an NGN network. In this regard, the channel servlets 235 can process voice interactions as a voice enabler and voice server to visual endpoint 260A incorporating a voice interface utilizing the Real Time Protocol (RTP) over HTTP, or a voice endpoint 260B utilizing SIP. Likewise, the channel servlets 235 can process visual interactions as a Web application to a visual endpoint 160A. As yet another example, the channel servlets 235 can process instant message interactions as an instant messaging server to an instant messaging endpoint 260C.

More specifically, the channel servlets 235 can be enabled to process HTTP requests for interactions with a corresponding session 225 for a composite multimedia service. The HTTP requests can originate from a visual mode oriented Web page over a visual channel 245, from a visual mode oriented instant messaging interface over an instant messaging channel 255, or even in a voice mode over a voice channel 250 enabled by SIP. Similarly, the channel servlets 235 can be enabled to process SIP requests for interactions with a corresponding session 225 for a composite multimedia service through a voice enabler which can include suitable voice markup, such as VoiceXML and call control extensible markup language (CCXML) coupled to a SIPlet which, in combination, can be effective in processing voice interactions for the corresponding session 225 for the composite multimedia service, as it is known in the art.

Each of the channel servlets 235 can be coupled to a model servlet 220. The model servlet 220 can mediate interactions with a model 210 for an associated one of the sessions 225. Each of the sessions 225 can be managed within a session manager 220 which can correlate different channels of communication established through the channel servlets 235 with a single corresponding one of the sessions 225. The correlation of the different channels of communication can be facilitated through the use of a coupled location registry 230. The location registry 230 can include a table indicating a host name of systems and channels active for the corresponding one of the sessions 225.

The model servlet 215 can include program code enabled to access a model 210 for a corresponding session 225 for a composite multimedia service providing different channels of access 245, 250, 255 through different endpoints 260A, 260B, 260C. For instance, the model 210 can be encapsulated within an entity bean within a bean container. Moreover, the model 210 can store session data for a corresponding one of the sessions 225 irrespective of the channel of access 245, 250, 255 through which the session data for the corresponding one of the sessions 225 is created, removed or modified.

Notably, changes in state for each of the sessions 225 for a composite multimedia service can be synchronized across the different views 260 for the different channels of access 245, 250, 255 through a listener architecture. The listener architecture can include one or more listeners 240 for each model 210. Each listener can correspond to a different channel of access 245, 250, 255 and can detect changes in state for the model 210. Responsive to detecting changes in state for the model 210 for a corresponding one of the sessions 225 for a composite multimedia service, a listener 240 can provide a notification to subscribing view 260 through a corresponding one of the channel servlets 235 so as to permit the subscribing views 260 to refresh to incorporate the detected changes in state for the model 210.

Figure 3:
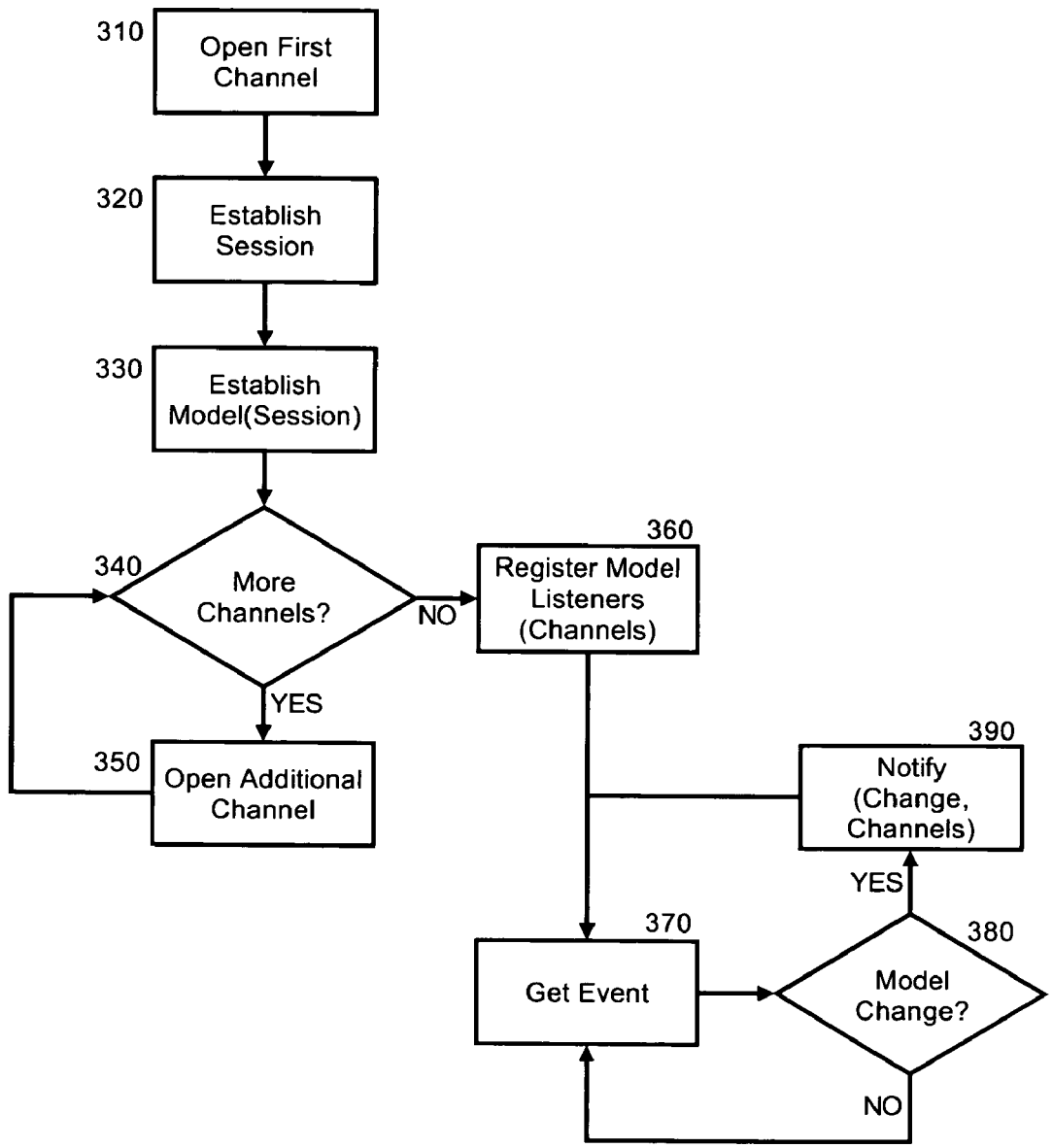

FIG. 3 is a flow chart illustrating a process for managing multiple channels of access to a single session for a composite service in the data processing system of FIG. 2. Beginning in block 310, a first channel of access can be opened for the composite multimedia service and a session can be established in block 320 with the composite multimedia service. Data for the session can be stored in a model for the session which can be established in block 330. If additional channels of access are to be established for the session in decision block 340, the process can continue in block 350. In block 350, an additional channel of access can be established for the same session for as many additional channels as required.

When no further channels of access are to be established in decision block 340, in block 360 a listener can be registered for each established channel of access for the session. Subsequently, in block 370 events can be received in each listener. In decision block 380, when a model change is detected, in block 390, the model change can be provided to each endpoint for selected ones of the established channels of access. In consequence, the endpoints can receive and apply the changes to corresponding views for the selected ones of the established channels of access for the same session, irrespective of the particular channel of access through which the changes to the model had been applied.

Figure 4:
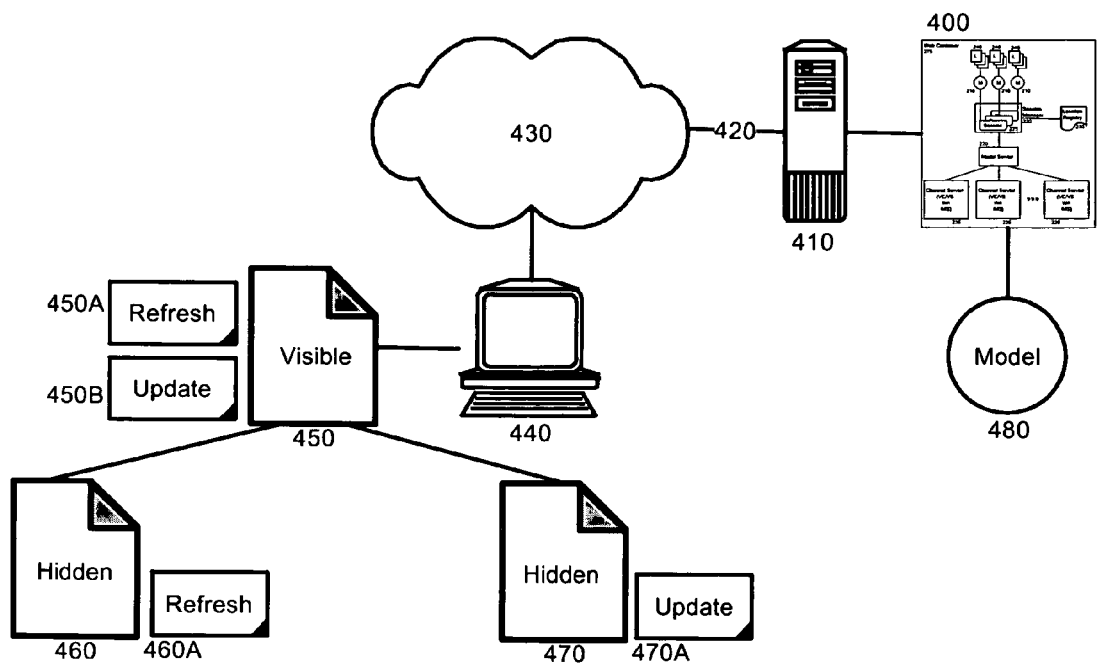
FIG. 4 is a schematic illustration of a view for a visible channel enabled to seamlessly reflect model updates for a session; and, FIG. 5 is a flow chart illustrating a hidden page process for seamlessly updating a user interface element in a visible page for a visible channel of access to a common session in a composite services enablement environment.

Notably, in the present invention frequent reloading of the view for a visual channel to a session can be avoided through the use of a hidden page child to the visible page of the view. In illustration, FIG. 4 is a schematic illustration of a view for a visible channel enabled to seamlessly reflect model updates for a session. As shown in FIG. 4, the composite services enablement data processing system 400 can be communicatively coupled to an endpoint 440 over a data communications network 430 through a visual channel of access 420 to a session having an associated model 480. The endpoint 440 can include a view defined by a visible page 450.

The visible page 450 can include markup defining a set of user interface elements through which an end user can interact with the session including viewing updated values in the model 480 provided by other views for other channels of access to the session, and by providing updated values to the model 480 for synchronization with other views for other channels of access to the session. Importantly, the visible page 450 need not include an attribute defining a refresh interval causing the periodic reloading of the visible page 450. Instead, a refresh script 450A can be included in the visible page 450 to provide functionality for updating a specified user interface element in the visible page 450.

In this regard, a hidden child page 460 can be coupled to the visible page 450 which can include an attribute defining a refresh interval. A complimentary refresh script 460A can be disposed in the hidden page 460 and can call the refresh script 450A to update the user interface element in the visible page 450 when a value change is detected by the complimentary refresh script 460A during a refresh cycle for the user interface element in the hidden page. In this way, changes to the model 480 applied by other views over other channels of access to the session can be seamlessly reflected in the visible page 450 without requiring a reloading of the visible page 450.

In addition to the refresh script 450A in the visible page 450, an update script 450B can be included in the visible page 450. The update script 450B can include program code enabled to detect a value change for a user interface element in the visible page 450. When a value change is detected for a user interface element in the visible page 450, the update script 450B can invoke complimentary update script 470A in another hidden child page 470 for the visible page 450. The complimentary update script 470A can invoke the updating of the model 480 over the visual channel of access 420 seamlessly without causing a reloading of the visible page 450.

Figure 5:
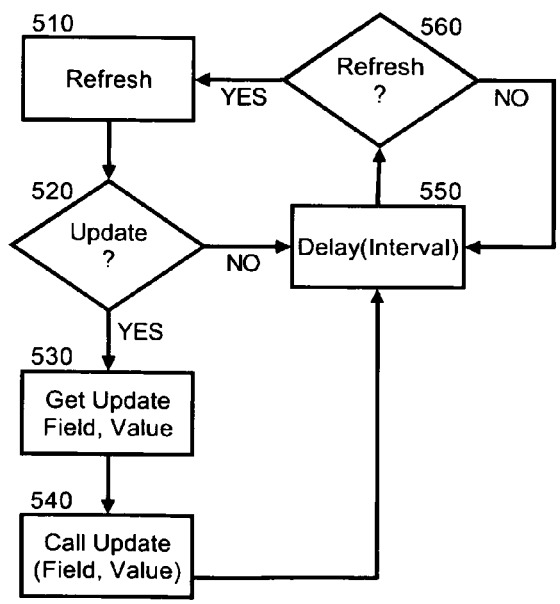

In further illustration, FIG. 5 is a flow chart illustrating a hidden page process for seamlessly updating a user interface element in a visible page for a visible channel of access to a common session in a composite services enablement environment. Beginning in block 510, the hidden page can be refreshed according to an interval defined as a markup attribute for the hidden page. In decision block 520, it can be determined whether a value for a user interface element in the hidden page, for instance a field in a form, has been changed from a previous value.

If so, in block 530 the identity of the user interface element and the new value can be retrieved and in block 540, a refresh script in the parent visible page can be invoked for the user interface element along with the new value. The refresh script in the parent visible page in turn can apply the new value to the user interface element without requiring a reloading of the visible page. Subsequently, in block 550 a delay for the interval can be processed and, in decision block 560, if a refresh is required according to the interval, the process can repeat through block 510.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A composite service enabling data processing system comprising:

a plurality of channel servlets executing in an application server in a data processing system for storing and executing program code including at least one processor coupled to memory elements through a system bus, the servlets enabled to establish multiple different channels of access to a common session for a composite service;

a location registry comprising a table of entries associating the different channels of access with the common session for the composite service; and, a model servlet configured for coupling to a model for the common session, for modifying state data in the model for the common session, and to synchronize views for each of the different channels of access to the common session responsive to changes detected in the model;

at least one of the views comprising a visible page coupled to a hidden page, the hidden page comprising both a refresh attribute specifying a refresh interval for the hidden page, rendering a form with a plurality of fields in the visible page;

configuring the visible page with a refresh script enabled to apply a value change to a selected one of the fields; and also a complimentary update script exposed to the visible page and enabled to invoke a refresh script in the visible page responsive to detecting a value change in the model for a user interface element in the hidden page corresponding to the user interface element in the visible page.

2. The system of claim 1, wherein the hidden page further comprises an additional configuration to apply an update to the model responsive to receiving a request to update the model from the visible page.

3. The system of claim 1, further comprising an additional hidden page comprising a configuration to apply an update to the model responsive to receiving a request to update the model from the visible page.

4. The system of claim 1, wherein the configuration of the hidden page comprises a complimentary update script exposed to the visible page and enabled to invoke the refresh script in the visible page responsive to detecting a value change in the model for a user interface element in the hidden page corresponding to the user interface element in the visible page.

5. The system of claim 2, wherein the additional configuration of the hidden page comprises a complimentary update script exposed to the visible page enabled to apply an update to the model responsive to receiving a request to update the model from the visible page.

6. The system of claim 4, wherein the visible page comprises an update script enabled to call the complimentary update script in the hidden page responsive to receiving a request to update the model from within the visible page.

7. The system of claim 5, wherein the visible page comprises an update script enabled to call the complimentary update script in the additional hidden page responsive to receiving a request to update the model from within the visible page.

8. The system of claim 1, wherein the channel servlets comprise a voice enabler and voice server enabled to establish for the common session, a voice channel of access to the common session for the composite service.

9. The system of claim 1, wherein the channel servlets and model servlet are disposed in an Internet protocol (IP) multimedia subsystem (IMS) in a next generation networking (NGN) network.

10. A method for seamlessly updating a user interface element in a visible page for a visible channel of access to a common session in a composite services enablement environment, the method comprising:

establishing a visible channel of access to a shared session shared commonly with other channels of access in the composite services enablement environment;

rendering a visible page for the visible channel of access and a hidden page for the visible channel of access;

reloading the hidden page at a determined interval to capture updates to a model for the shared session applied over the other channels of access;

receiving in the hidden page a change in value for a user interface element reflecting an update for the model for the shared session;

causing the visible page to reflect the change in value for a corresponding user interface element in the visible page;

rendering a form with a plurality of fields in the visible page;

configuring the visible page with a refresh script enabled to apply a value change to a selected one of the fields;

configuring the hidden page to refresh at a specified interval; and, further configuring the hidden page with a complimentary refresh script enabled to call the refresh script in the visible page to apply a value change to the selected one of the fields corresponding to a field in the hidden page.

11. The method of claim 10, further comprising: receiving in the visible page a request to update the model for the shared session; and, causing the hidden page to update the model for the shared session.

12. A computer program product comprising a non-transitory medium having computer usable program code for seamlessly updating a user interface element in a visible page for a visible channel of access to a common session in a composite services enablement environment, the computer program product including:

computer usable program code for establishing a visible channel of access to a shared session shared commonly with other channels of access in the composite services enablement environment;

computer usable program code for rendering a visible page for the visible channel of access and a hidden page for the visible channel of access;

computer usable program code for reloading the hidden page at a determined interval to capture updates to a model for the shared session applied over the other channels of access;

computer usable program code for receiving in the hidden page a change in value for a user interface element reflecting an update for the model for the shared session; and, computer usable program code for causing the visible page to reflect the change in value for a corresponding user interface element in the visible page;

computer usable program code for rendering a form with a plurality of fields in the visible page;

computer usable program code for configuring the visible page with a refresh script enabled to apply a value change to a selected one of the fields;

computer usable program code for configuring the hidden page to refresh at a specified interval; and computer usable program code for further configuring the hidden page with a complimentary update script enabled to call the refresh script in the visible page to apply a value change to the selected one of the fields corresponding to a field in the hidden page.

13. The computer program product of claim 12, further comprising:

computer usable program code for receiving in the visible page a request to update the model for the shared session; and, computer usable program code for causing the hidden page to update the model for the shared session.

* * * * *